United States Patent [19]

Anderson et al.

[11] Patent Number: 5,224,692
[45] Date of Patent: Jul. 6, 1993

[54] VERSATILE WIDE OPENING VISE

[76] Inventors: Donald W. Anderson; Robert C. Anderson, both of 4657 W. Rosecrans Ave., Hawthrone, Calif. 90250

[21] Appl. No.: 743,771

[22] Filed: Aug. 12, 1991

[51] Int. Cl.⁵ .............................................. B23Q 1/04
[52] U.S. Cl. ...................................... 269/75; 269/167; 269/253; 269/244
[58] Field of Search .......................... 269/75, 250–253, 269/166–170, 271, 279, 244

[56] References Cited

U.S. PATENT DOCUMENTS

| | | | |
|---|---|---|---|
| 269,709 | 12/1882 | Read | 269/75 |
| 2,221,325 | 11/1940 | Holman | 269/167 |
| 4,306,709 | 12/1981 | Hurn | 269/75 |

FOREIGN PATENT DOCUMENTS 2912832  10/1980  Fed. Rep. of Germany ...... 269/253

Primary Examiner—Robert C. Watson
Attorney, Agent, or Firm—Roger A. Marrs

[57] ABSTRACT

A fast acting and adjustable vise is disclosed herein having an elongated base movably supporting a pair of jaws adjustable between opposing holding surfaces for releasably supporting small parts or workpieces. Manually rotatable wheels are operably coupled to each jaw for independent and separate movement along a linear path and a universal mounting device adjustably supports the vise on a supporting surface. In one form, one jaw of the pair includes a finger-operated resilient clamp for selectively and rapidly positioning the clamp to a desired location on the base.

2 Claims, 3 Drawing Sheets

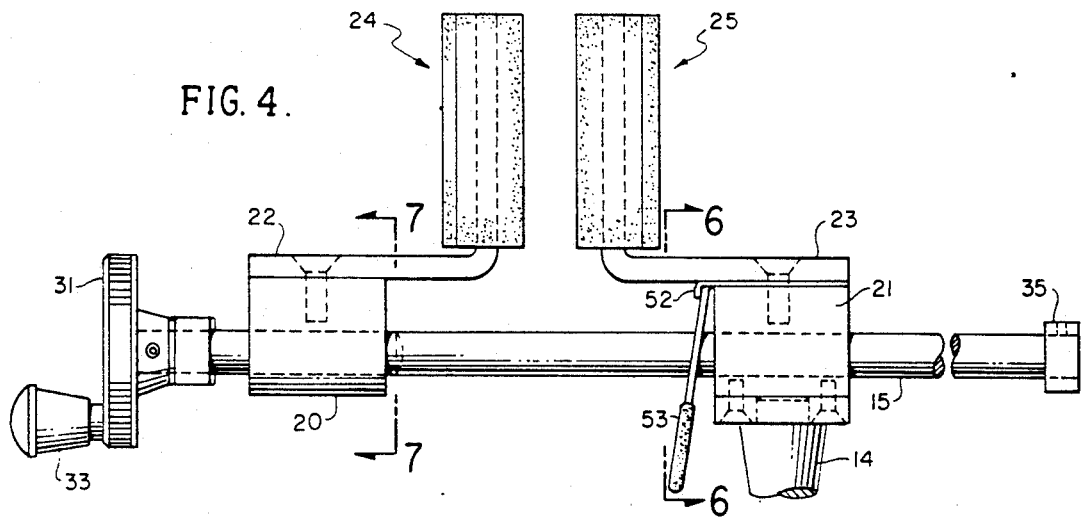
FIG. 4.
FIG. 5.
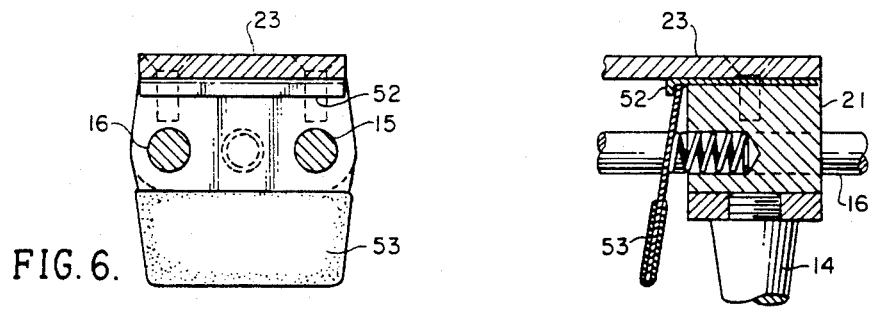
FIG. 6.
FIG. 8.
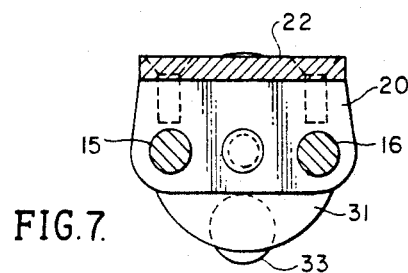
FIG. 7.

VERSATILE WIDE OPENING VISE

BACKGROUND OF THE INVENTION

1. Field of the Invention

The present invention relates to the field of parts holding devices such as vises or the like, and more particularly to a novel fast-acting vise having a manually movable jaw set capable of being rapidly deployed on a base which may be mounted on a universal support for ease of part orientation.

2. Brief Description of the Prior Art

In the past, it has been the conventional practice to employ a vise having a jaw set between which parts are held so that a workman can readily perform manufacturing or fabricating procedures on the part. In this connection, one jaw of the jaw set is generally made movable so that it may travel towards and away from the other jaw in order to provide a clamping function on a part disposed between the jaws. The movable jaw is sometimes slidably mounted on a rod which is then releasably secured in a selected location by means of a thumbscrew or turning key fastening arrangement.

Although the prior vises have been successful for handling large parts where speed, precision and size of part are of no concern, difficulties and problems have been encountered which stem largely from the fact that the procedure is slow when handling relatively small, delicate or precision-made parts such as employed in the electronic industry. Furthermore, other problems have been encountered due to the fact that the materials of the vise are subject to contamination and cannot be used in environmentally controlled clean rooms or the like. Although some prior vises have been made movable in the sense that they can rotate about a central vertical axis, full articulation of the vise for orienting the part held between the jaws is generally unavailable or is restricted so as not to provide a completely articulated movement.

Therefore, a long-standing need has existed to provide a novel parts holding device which includes a clamping jaw set that may be manually operated by the left or right hand and wherein one jaw or the other can be selected for movement. Also, means for quick disconnect of a selected jaw to the base is advantageous so that the clamping action can readily be released or set at the will of the user. Also, such a means should include a clamping vise which is mounted on a work positioner so that a universal movement is available for full articulation of the vise so that the workpiece or part may be readily oriented for convenient fabrication or handling of the workpiece. Furthermore, the vises and positioner never need lubrication so as to avoid any contamination.

SUMMARY OF THE INVENTION

Accordingly, the above problems and difficulties are obviated by the present invention which provides a novel fast-acting and adjustable clamping vise which includes an elongated base for supporting a pair of movable jaws so that their opposing surfaces may be brought together into a clamping action about a workpiece. Means are provided for separately moving the jaws with respect to one another and a universal work positioner mounts the vise onto a supporting structure so that full articulation is provided so that the workpiece can be oriented to a desired working position. Further, a release mechanism is included on a selected one of the jaws which is finger-operated so that the selected jaw can readily be secured to the base at a desired location and which may be rapidly unsecured for movement along the base to a new clamping position. The opposing jaw surfaces provide broad and flat part engagement surfaces for holding delicate and small parts.

Therefore, it is among the primary objects of the present invention to provide a novel small part holding vise which includes a pair of jaws that are both movable along a base to desired clamping positions and such movable means are separate and independent from each other.

Another object of the present invention is to provide a novel small part holding vise which is fast-acting in locating one jaw of a jaw set along a base so that a workpiece may readily be clamped between the opposing surfaces of the jaw set.

Another object of the present invention is to provide a novel quick release and fast-acting means for releasably mounting a jaw of a jaw set onto the base of a vise so that the jaw set may readily be moved on the base to desired work positions with ease and convenience.

Yet another object of the present invention is to provide a novel work positioner for a clamping vise adapted for full articulation in order to orient small parts held by the vise for precision work procedures.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 4 is a front elevational view of a vise illustrating a quick release mechanism for positioning a selected one of the jaw members on the vise base;

FIG. 5 is a top plan view of the clamping vise shown in FIG. 4;

FIG. 6 is a transverse cross-sectional view of the vise jaw member shown in FIG. 4 as taken in the direction of arrows 6—6 thereof;

FIG. 7 is a transverse cross-sectional view of the vise shown in FIG. 4 as taken in the direction of arrows 7—7 thereof; and FIG. 8 is a longitudinal sectional view of the quick release mechanism illustrated in the direction of arrows 8—8 of FIG. 5.

DESCRIPTION OF THE PREFERRED EMBODIMENT

Figure 1:
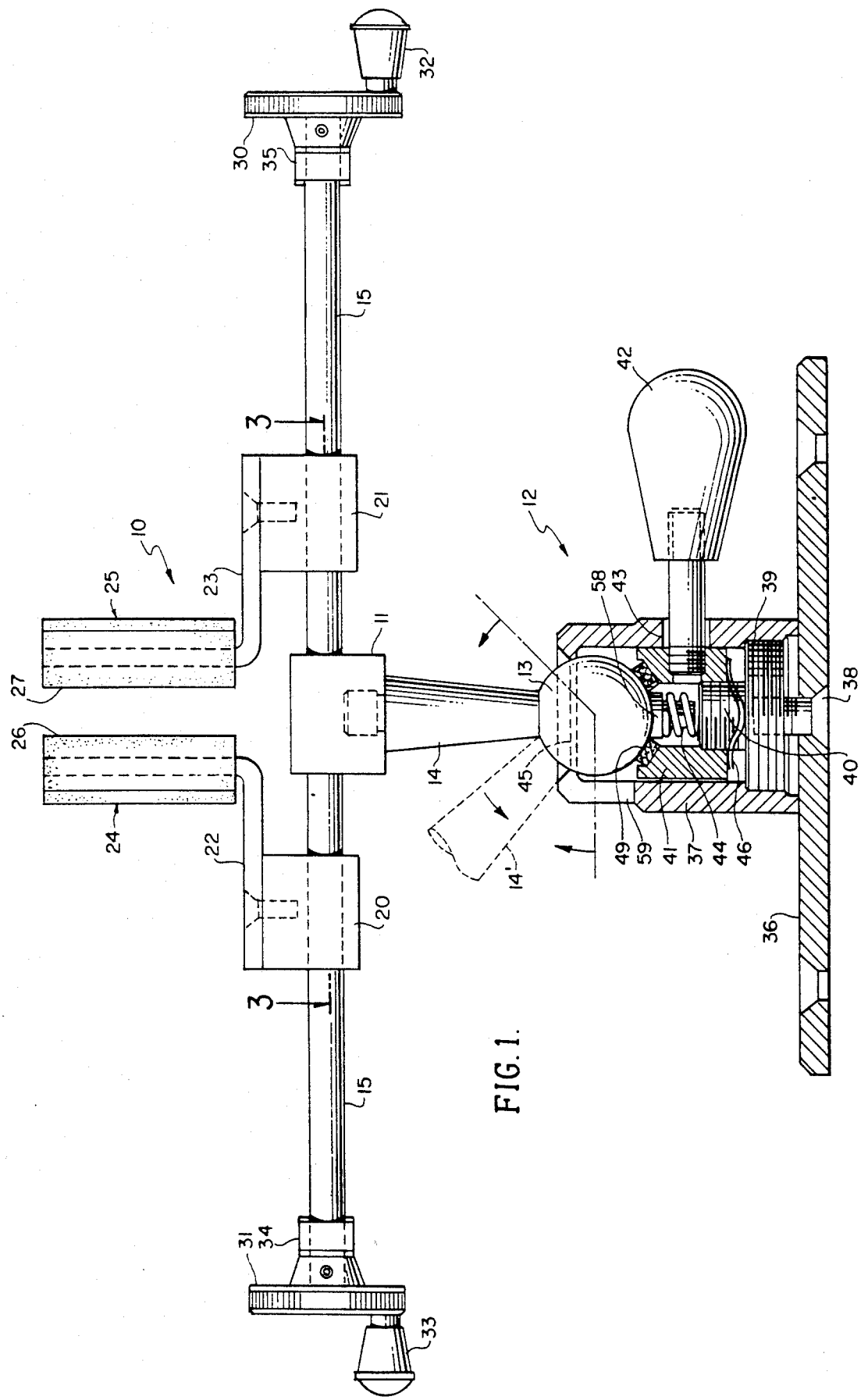
FIG. 1 is a front elevational view of the clamping vise of the present invention illustrated as being mounted on a universal work positioner illustrated in cross-section.

Referring to FIG. 1, the novel versatile vise of the present invention is illustrated by arrow 10 which includes a main body base 11 composed of all cast zinc chrome plated which is held in a stationary position by means of a work positioner indicated in the general direction of arrow 12. The work positioner includes a ball 13 having a stud 14 threadably attached to the underside of the base 11. The base 11 further includes outwardly projecting and parallel guide rods 15 and 16. Mounted on the parallel rods in sliding relationship are sliders 20 and 21 which may be moved along the length of the rods in either direction. Therefore, the sliders may be moved to the outward ends of the rods or may be reversed and moved inwardly towards the base 11. Each of the respective sliders 20 and 21 includes an L-shaped bar 22 and 23 for mounting a jaw set identified by numerals 24 and 25. The jaw sets are arranged so that opposing clamping surfaces 26 and 27 face one another for clamping purposes about a workpiece. A feature of the invention resides in the fact that the jaws 24 or 25 may be moved towards the other jaw for a clamping procedure by actuation from either end of the device so that any time during a working procedure, either jaw may be moved in a forward or a reversing direction from either side of the apparatus to increase the clamping length capacity.

In this latter connection, hand wheels 30 and 31 are associated with the outward ends of the guide rods. The wheels include rotating knobs 32 and 33 that may be readily grasped by the fingers of the user in order to turn the wheels in either direction to advance or reverse the jaw members from either end of the vise. It is to be noted that the outwardly extending or cantilevered ends of the guide rods 15-16 inclusive are joined together respectively by spacers 34 and 35. The drive mechanism connecting the hand wheel 30 and the hand wheel 31 to the respective jaws will be described with respect to FIG. 2.

Referring further to FIG. 1, a work positioner is indicated in the direction of arrow 12 which provides full articulation of the vise 10 so that a workpiece clamped between the jaw sets 24 and 25 can be oriented to a selected disposition. In this connection, a support base 36 is indicated on which a main body 37 is carried via a mounting screw 38. An adjusting screw 39 is composed of zinc and includes left hand threads on a stud 40 and right hand threads engageable with the main body. A zinc lock nut 41 is provided within the hollow of body 37 and is in threaded engagement with the left hand threads on the stud 40 so that as a knob 42 is horizontally rotated through a slot 43 in the body 37, the nut 41 will rise through the body and force a fiber washer 49 into locking contact with the ball or sphere 13. A coil spring 44 applies a resilient pressure to the underside of the ball and stud so that the ball is normally biased into contact with a curved retaining shoulder 45 provided on the body 37. A pair of wavey washers, such as washer 46, and a Teflon pressure pad 49 provide a yieldable tension on the nut 41 so that precise horizontal movement of the knob 42 about a vertical axis through the ball 13 is provided. The pressure pad keeps the ball and stud from flopping down when the lock nut is unlocked. A vertical slot 39 permits angular movement of stud 14 as shown in broken lines.

Figure 2:
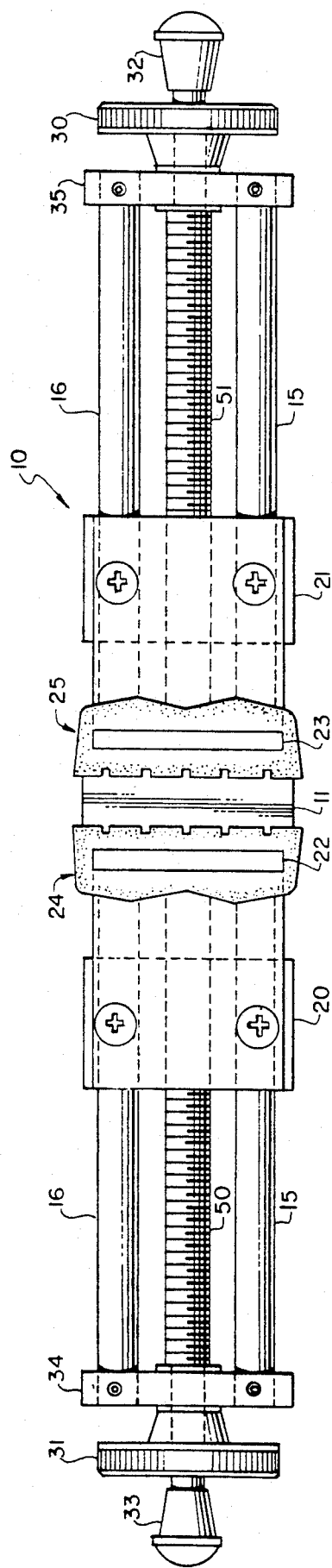
FIG. 2 is a top plan view of the vise shown in FIG. 1.
Figure 3:
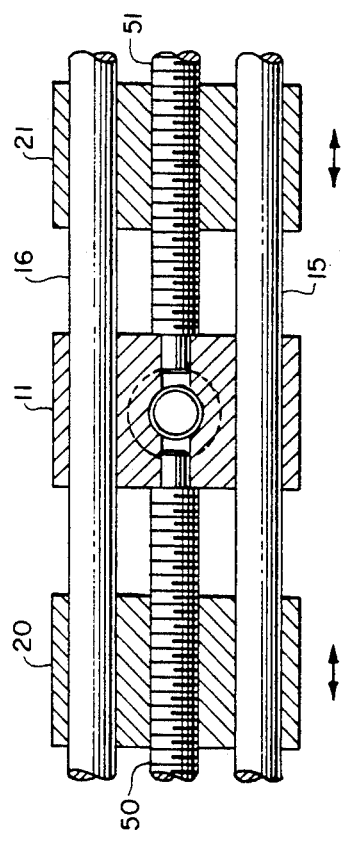
FIG. 3 is a longitudinal cross-sectional view of a portion of the vise shown in FIG. 1 as taken in the direction of arrows 3—3 thereof.

Referring now in detail to FIG. 2, the actuating mechanism for the vise 10 is illustrated as employing a pair of lead screws 50 and 51 which are rotatably mounted to the midsection of the base 11, as shown in FIG. 3, and having their opposite ends operably connected to the hand wheels 30 and 31 respectively. Therefore, each lead screw is independently operated by the respective hand wheels 30 and 31. Bearings are provided for the shaft of the lead screws 50 and 51 that are suitably carried on the end spacers or pieces 34 and 35 respectively. The lead screws 50 and 51 are disposed between the pairs of spaced and parallel guide rods 15 and 16 with the sliders 20 and 21 threadably engageable with the threads of the lead screws as shown in FIG. 3. Therefore, as the end wheels 30 and/or 31 are rotated either clockwise or counterclockwise, the respective sliders 20 and 21 will move along the length of the guide rods accordingly to open or close the space between the opposing surfaces of the jaw sets 24 and 25. It is noted in FIG. 3 that the guide rods are two separate rods arranged in spaced-apart relationship with the lead screws 50 and 51 disposed between the rods, and the rods may terminate in a fixed connection with the stationary spaces 34 and 35, as previously described.

Referring now in detail to FIGS. 4-8 inclusive, additional details are shown for the mounting of the sliders 20 and 21 on the guide rods extending between opposite ends of the vise. However, in this embodiment, a single hand wheel 31 is employed operating the slider 20 by means of the lead screw, as previously described. As the slider moves back and forth along the guide rods, the jaw set 24 is moved therewith to either close or open the space between the opposing jaw set 25. However, it is to be noted that the slider 21 includes a quick release mechanism shown more clearly in FIG. 8, wherein the stud 14 of the work positioner 12 is secured to the underside thereof. The quick release mechanism includes a catch plate 52 having an exposed hook portion which is received by the end of a lever 53 that is normally biased into locking engagement therewith. Release is achieved by using finger pressure against the lever arm to overcome the tension of the spring to effect release whereby the slider 21 can move on the guide rods.

In view of the foregoing, it can be seen that the jaw sets 24 and 25 provide a versatile, fast-acting wide opening vise head into which small parts may be placed, followed by effecting a clamping action by moving either of the jaw mounted sliders 20 or 21 from either end of the device. In one instance, the hand crank may be used by right or left-handed persons to move the jaws from either end of the vise or, if desired, the quick release mechanism, as shown in FIG. 8, may be employed for slider movement. Also, as shown in FIGS. 4 and 5, a combination of wheel and lead screw operated jaws may be combined with the quick release movable jaw for other specific applications. In either instance, the clamping jaws can be reversed and the entire device or apparatus is suitable for clean room environment and high technical product fabricating procedures since the bulk of the parts are composed of zinc, steel, and lead die-cast parts.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A versatile, quick-acting vise comprising:
   a base;
   elongated guide means carried on said base and having opposite ends;
   a pair of movable jaws slidably carried on said guide means;
   manually operated actuating means carried on said opposite ends of said guide means for moving only one of said jaws away from and towards the other jaw in response to said manually operated actuating means carried on opposite ends of said guide means;

a work positioner having a support means retaining a ball and stud combination with said stud secured to said base;

spring means operable on said ball and stud combination to normally bias and load said combination to hold in a set position;

said support means including a lock nut attached to a horizontally movable handle operable to selectively urge said lock nut into and out of locking engagement with said ball;

each jaw of said pair includes a slider movably carried on said guide means, an L-shaped bracket secured to said slider and a jaw member secured to said L-shaped bracket so that opposing jaw member surfaces define a clamping area holding a workpiece;

said clamping area being alternately reduced and increased in distance between opposing jaw surfaces from either end of said vise base via said manually operated actuating means.

2. A versatile, quick-acting vise comprising:

a base;

guide means carried on said base and having opposite ends;

a pair of movable jaws slidably carried on said guide means;

manually operated actuating means carried on opposite ends of said guide means for moving only one of said jaws of said pair away from and toward the jaw of said pair in response to said manually operated actuating means carried on opposite ends of said guide means;

each jaw of said pair includes a slider movably carried on said guide means, an L-shaped bracket secured to said slider and a jaw member secured to said L-shaped bracket so that opposing jaw member surfaces define a clamping area holding a workpiece;

said clamping area being reduced and increased in distance between opposing jaw surfaces from either end of said vise base;

a work positioner attached to said base having a universal joint for mounting said base to a supporting structure;

said universal joint having a releasable locking mechanism and movable handle for operating said locking mechanism;

said locking mechanism includes a ball retained in a body by spring tension to bias said ball in a loaded position at all times and including a lock nut movable within said body to releasably engage with said ball;

a stud attached at one end to said ball and at its opposite end to said base;

said jaw opposing clamping surfaces are configured to hold a workpiece therebetween when said jaws are in their clamping condition subsequent to manual operation from either end of said guide means by said actuating means.

* * * * *